United States Patent Office 2,766,439
Patented Oct. 9, 1956

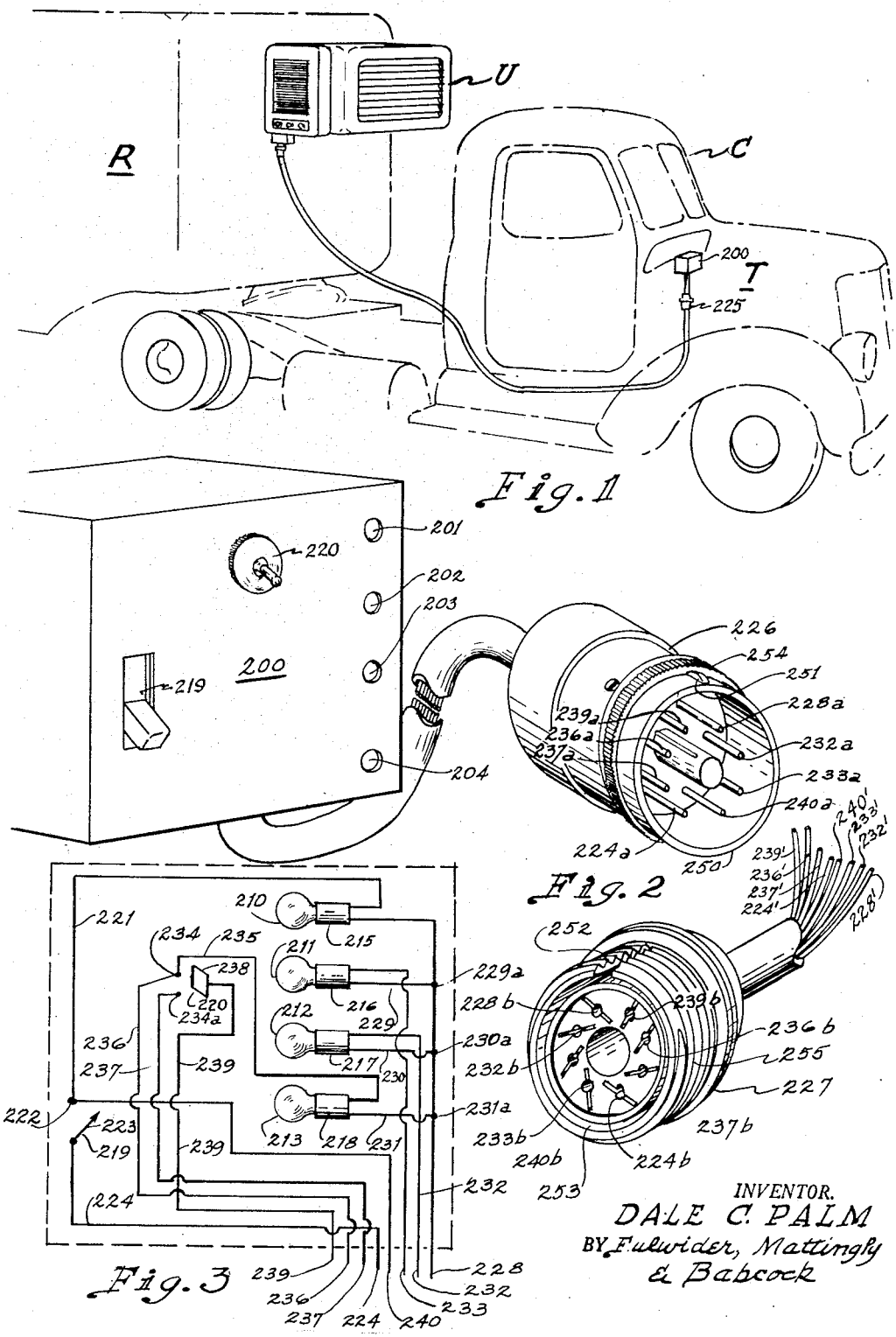
Oct. 9, 1956     D. C. PALM     2,766,439
COMBINATION REFRIGERATING CONTROL AND SIGNALING DEVICE
Filed Sept. 16, 1953     2 Sheets-Sheet 1
INVENTOR.
DALE C. PALM
BY Fulwider, Mattingly & Babcock

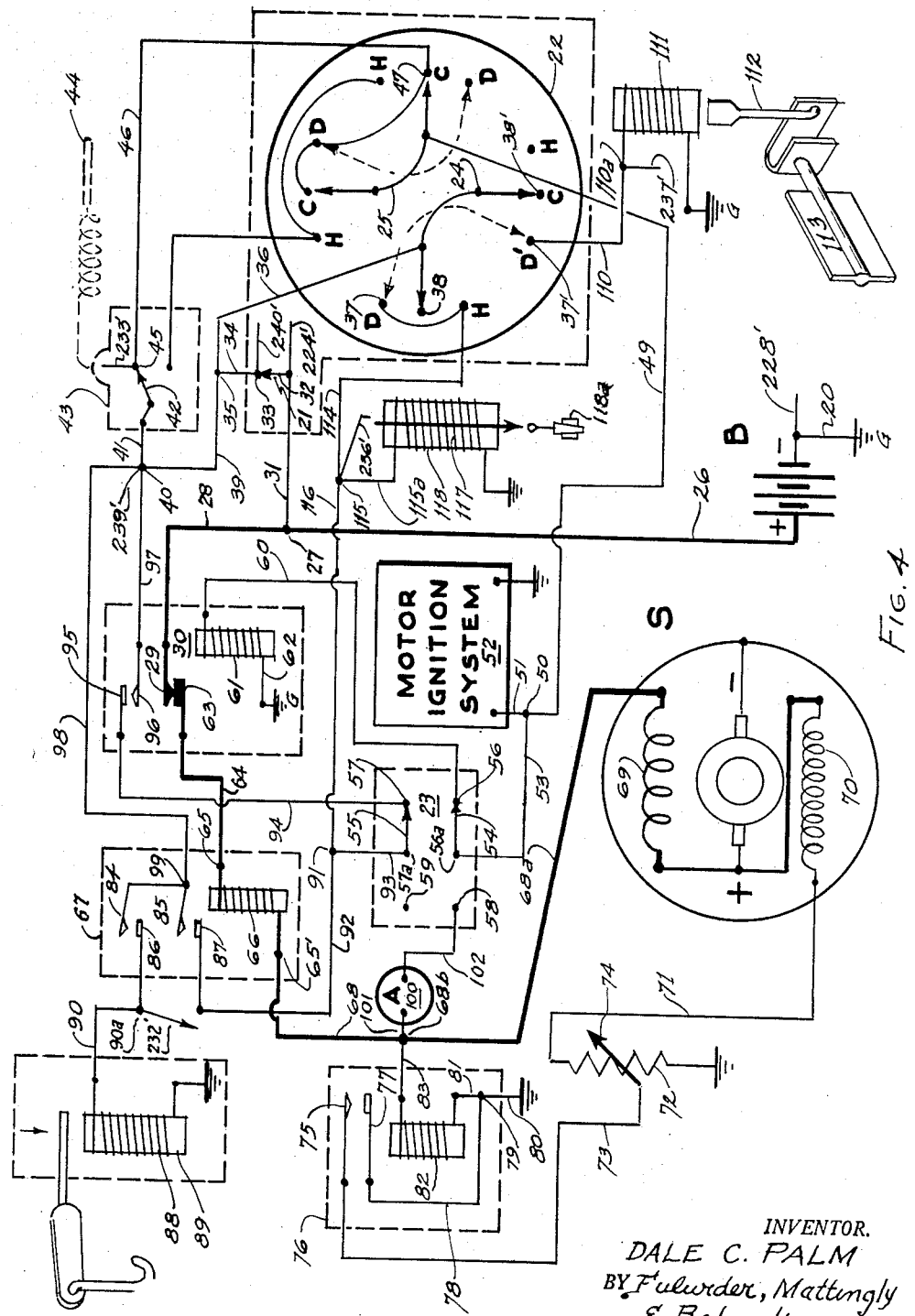

2,766,439
COMBINATION REFRIGERATING CONTROL AND SIGNALING DEVICE

Dale C. Palm, Downey, Calif., assignor to Cab Control Company, Downey, Calif., a partnership Application September 16, 1953, Serial No. 380,500

6 Claims. (Cl. 340—222)

The present invention relates generally to the field of refrigeration, and more particularly to a control for a refrigerating unit particularly adapted for installation in the cab of a truck tractor for controlling and indicating the operating status of a power-driven refrigerating unit mounted on and used in cooling a trailer drawn by said tractor. In addition, the invention may be used with a refrigerated truck, a trailer drawn thereby, or a combination of both.

During the past few years the use of tractor-drawn trailers refrigerated by independent power-driven units associated therewith has increased tremendously. The growing demand and use of power-driven refrigeration units for this purpose has given impetus to the development of numerous improvements in the automatic control thereof and incorporated therein. However, mechanical refrigeration of truck trailers with even the most modern and improved units available today is not completely satisfactory due to faulty operation of the refrigeration unit, and it is not an uncommon occurrence for perishable cargo to be severely damaged or altogether ruined.

The problems encountered in refrigerating a truck trailer carrying perishable products such as fruit, vegetables, dairy products, meat, and the like, are somewhat unique, and are markedly different from that involved in refrigerating the same products by means of a stationary unit in a fixed location. Truck tractors and refrigerated trailers are expensive pieces of equipment, and the maximum profit may be derived therefrom only when implemented to their fullest extent.

The refrigerating unit utilized on a truck trailer therefore, may be required to operate for prolonged periods of time, with its operation only interrupted during defrosting thereof. Furthermore, most of this operating time occurs while the trailer is in motion whereby the unit is constantly subject to vibration of varying intensity. Over long periods of time, such vibration very often will adversely affect one or more of the components controlling the operation of the refrigerating unit.

Not only is the refrigerating unit associated with a truck trailer subject to more rigorous operation conditions than a stationary unit, but it is not possible to give a stationary installation. The refrigerating unit is normally mounted on the upper forward end of a truck trailer, which is an inconvenient position to reach. Furthermore, the normal truck driver is employed for his skill in handling large transportation equipment, as well as his ability to meet the time schedule set up for this operation. A driver's interest in the refrigerating unit on the truck trailer is therefore at most perfunctory, and such attention as he may give the unit can only be when the tractor and trailer are stationary. During the time the tractor and trailer are in motion it is, of course, impossible to inspect the refrigeration unit, and the driver can only trust that the automatic controls thereof are opertaing properly.

The refrigerating unit used on a trailer not only must operate under severe conditions with a minimum of maintenance attention, but is subject to meeting the demands of varying loads. At the time fresh vegetables are packed in a refrigerated trailer they have a high moisture content which may vary between damp and wet. As the unit circulates cooled air throughout the trailer, this air picks up moisture from the vegetables. Moisture carried by the circulated air is deposited on the cooling coils of the unit where it freezes, and as is well known, the resulting ice coating acts as insulation, decreasing the efficiency of the unit. Due to the varying moisture content of cargoes, devices for automatically de-icing the coils at predetermined time intervals have always proven unsatisfactory.

The primary purpose in devising my present invention is to provide a device adapted to be situated in the cab of a tractor, that at all times will indicate the operating status of the unit.

A major object of my invention is to provide a small, compact control and signaling apparatus that may be mounted in the cab of a tractor to control and indicate the operating status of an independent mechanically-driven refrigerating unit mounted on a trailer drawn by the tractor, is adapted to be removably connected to various sizes and styles of mechanical refrigerating units as the trailers on which they are mounted are drawn by a tractor in which it is installed to minimize the spoilage of perishable goods due to lack of knowledge on the part of the driver as to the unit operation.

Another object of my invention is to supply a device of simplified structure that may be easily operated by the driver of a tractor when the vehicle is in motion to control the functioning of a refrigerator unit, and one that takes so little time and effort on the part of the driver to operate that it does not appreciably detract from his driving.

Yet another object of my invention is to provide a device that permits a truck driver to manually defrost the coils of the refrigeration unit at increasingly longer time intervals, due to the fact that as the moisture initially present in the cargo is removed by the circulated cooled air in the form of ice deposited on the cooling coils of the unit.

A still further object of my invention is to supply a device that is relatively inexpensive to manufacture, may be easily installed on a trailer-drawing tractor, and requires little or no maintenance attention.

Yet another object of my invention is to provide a device that will reduce the wear on a refrigerating unit by disclosing at all times the operating status thereof, will prevent storage batteries from being run down and ruined due to the failure of the refrigerating unit engine in starting, and one which will positively so indicate when the refrigerating unit is not operating.

A still further object of my invention is to improve the efficiency of a tractor and trailer so equipped as transportation vehicles, by eliminating the necessity for stopping the equipment in order that the driver may inspect the operation of the refrigeration unit.

These and other objects and advantages of my invention will become apparent from the following description of a preferred form thereof, and from the drawing illustrating that form in which:

Figure 1 is a partial perspective view of a tractor and trailer on which my invention is mounted for controlling and indicating the operational status of a mechanical refrigeration unit;

Figure 2 is a perspective view of my invention;

Figure 3 is a diagrammatic view of the electrical wiring circuit used in conjunction with the device; and, Figure 4 is a wiring diagram of a commercial refrigeration unit with which my invention is utilized.

Referring now to the drawing for the general arrangement of my invention, it will be seen that a mechanical refrigeration unit U is mounted on the upper forward portion of a trailer R adapted to be drawn by a tractor T. The tractor is provided with a cab C in which my invention for indicating the operational status of the unit U is positioned, and which is adapted to be readily controlled by the truck driver.

A single tractor T may be hitched to different types of trailers R over a period of time, each of which may be equipped with a different make or type of refrigeration unit U. This variance in refrigeration equipment is of no consequence in the use of my invention, so long as electrical conductors to be hereinafter identified in detail, lead from the unit wiring to a first portion of a connector where they are arranged in a predetermined pattern. In addition, my invention includes electrical conductors extending to a second portion of said connector and arranged in said predetermined pattern. The first and second portions of said connector are removably locked together. In this manner my invention may be employed with refrigeration units of various makes and models. The wiring diagram of a typical refrigeration unit U as now used on trailers is shown in Figure 4, and will be described later in illustrating the operation of my invention.

The mechanical refrigeration units U are actuated by a small internal combustion engine E that may be placed in operation by a combination starter and generator S, which during the engine starting operation, is powered by a storage battery B. Engine E serves to actuate a compressor in which a refrigerant such as Freon is compressed after it expands to cool refrigerating coils (not shown) over which air is circulated to cool the trailer interior.

Unit U is normally an integral self-contained assembly that may be mounted at the desired location on the trailer. Irrespective of the make, style or model number, the refrigeration unit includes a number of components as outlined below, which by interconnecting electrical wiring and controls, operate automatically insofar as possible to provide uniform cooling of the trailer interior.

A wiring diagram of the electrical circuits and controls utilized with a typical refrigerator unit U is shown in Figure 4. The negative terminal of battery B is connected to ground G. A starting switch 21, selector switch 22, and ammeter switch 23 are provided, and when switch 21 of the single-pole single-throw type is closed, and two jumpers 24 and 25 on selector switch 22 are properly aligned, the unit is in an operating condition.

An electrical conductor 26 extends from the positive terminal of battery B to a junction point 27, from which junction a conductor 28 leads to the armature 29 of a starter relay 30. A second conductor 31 leads from junction point 27 to a terminal on switch 21 connected to the movable blade 32 thereof. When blade 32 is closed it engages a contact 33 that is connected by a conductor 34 to a junction point 35. A conductor 36 extending between junction point 35 to jumper 24 is adapted to engage two contacts 37 and 37′ used in the defrosting operation, as will be described hereinafter. However, during the time unit U is refrigerating, the jumper 24 is used to engage contacts 38 and 38′.

A conductor 39 proceeds from junction point 35 to junction point 40, which junction 40 is connected by a conductor 41 to a movable electrical conducting arm 42 in a thermostat 43. This thermostat is provided with a temperature responsive bulb 44 situated within the confines of the truck or trailer under refrigeration. Arm 42 remains in engagement with a contact 45 until the desired temperature has been attained within the confines of the truck or trailer. Contact 45 is connected by conductor 46 to contact 47 in selector switch 22. Contact 47 may be engaged by jumper 25, and when so engaged, contact 47 transmits power to conductor 49 leading to a junction point 50.

A conductor 51 supplies electrical power from junction point 50 to the ignition assembly 52 of engine E, which assembly is of a conventional nature and need not be described herein. A conductor 53 leads from junction 50 to the double-pole, double-throw ammeter switch 23. This switch embodies two blades 54 and 55 which normally engage contacts 56 and 57 respectively as shown. Blades 54 and 55 may also engage contacts 58 and 59, but in the preferred form of my invention contact 58 is the only one of these two contacts used. With switch 23 disposed as shown in Figure 4, electrical power is transferred from contact 56a to contact 56 through a blade 54 then through lead 60 to solenoid 61 of starter relay 30. Conductor 62 connects solenoid 61 to ground G.

Energization of solenoid 61 causes armature 29 to engage a contact 63 that is connected by a conductor 64 to one terminal 65 of solenoid 66 in choke relay 67. Terminal 65′ of solenoid 66 is connected by conductors 68 and 68a to the starting field 69 of starter generator S. Starting field 69 is in series with a generator field 70 that is connected by a conductor 71 to a grounded charging rate resistor 72. A conductor 73 leads from an adjustable element 74 in resistor 72 to a contact 75 in voltage regulator 76, which regulator includes an armature 77 adapted to engage contact 75. A conductor 78 connects armature 77 to junction point 79 from which a conductor 80 extends to ground G, and another conductor 81 proceeds to one terminal of voltage regulator solenoid 82. Likewise a conductor 83 extends from the other terminal of solenoid 82 to junction point 68b.

Choke relay 67 includes two armatures 84 and 85 which are drawn into engagement with contacts 86 and 87 respectively when solenoid 66 is energized. Junction 40 has a conductor 98 extending therefrom to a junction point 99 to which the two choke relay armatures are connected. One terminal of the solenoid 88 of the automatic carburetor choke 89 is connected to ground G and the other to contact 86 by means of conductor 90. Contact 87 is connected to junction point 91 by a conductor 92, and a conductor 93 extends from junction 91 to blade 55 of switch 23. Conductor 94 leads from pole 57 of switch 23 to a contact 95 in the starter relay 30. Contact 95 may be engaged by an armature 96 connected to junction point 40 by conductor 97.

An ammeter 100 is provided, one terminal of which is connected to junction point 68b by means of a conductor 101, and the other terminal has a conductor 102 extending therefrom to contact 58 of switch 23.

To actuate refrigerating unit U, switch 21 is closed and the jumpers 24 and 25 of selector switch 22 are manually moved to the positions shown in Figure 4. Electrical current flows from battery B through conductor 26, junction point 27, conductor 31, to blade 32 of switch 21. The current continues to flow from blade 32 through contact 33, conductor 34, junction point 35, conductor 39, and junction point 40 to arm 42. If the temperature of the space to be refrigerated is below a predetermined point, the unit U will not operate. However, when the temperature is above said predetermined point, arm 42 will engage contact 45 and electrical current will flow therefrom to contact 47 of selector switch 22, and thence through conductor 49 to junction point 50. Electrical power is transmitted from junction point 50 to energize the ignition assembly 52 and starter relay solenoid 61 as shown. Upon energization of relay 61, armature 29 engages contact 63 and current then flows to solenoid 66 of the choke relay 67 and starting field 69 in starter generator S. Actuation of choke relay 67 causes armature 84 to engage contact 86 to complete a circuit to the automatic carburetor choke 89.

Concurrent with operation of engine E, the starting field 69 of starter generator S no longer draws electrical power from battery B and armatures 84 and 85 of the choke relay assume their normally open positions. Battery B is charged by current transmitted thereto from starter generator S through conductor 68a, junction point 68b, conductor 68, solenoid 66, conductor 64, starter relay 30, conductor 28, junction point 27, and thence to conductor 26.

Defrosting of unit U is accomplished by placing jumper 24 in engagement with terminals 37 and 37'. Electrical power then flows from terminal 37' through a conductor 110 to a grounded solenoid 111. When energized, solenoid 111 causes a plunger 112 to pivotally move a damper 113 to block the passage (not shown) through which cold air is blown into the confines of the truck or trailer under refrigeration. When jumper 24 is in engagement with terminals 37 and 37' as mentioned above, it also connects conductor 114 which extends to junction point 115. Junction 115 includes a conductor 116 which leads therefrom to junction point 91, and a second conductor 115a which joins one terminal of a grounded solenoid 117 on defrost valve 118. When energized, solenoid 117 opens valve 118, permitting hot compressed refrigerant on the discharge side of the compressor (not shown) to flow through a by-pass line 118a leading to the cooling coils to effect defrosting thereof. After defrosting is completed, jumper 24 is moved to the positions 38 and 38', and when the jumper 24 is so disposed, the electrical circuit to solenoid 111 is broken and the damper 113 moves to its normally open position whereby cooled air may be discharged into the space in the truck or trailer to be refrigerated. The solenoid 117 is also de-energized, which permits valve 118 to assume its normally closed position.

The above described unit U is merely one of a number of different makes and types of independent power-driven refrigerating devices used in the cooling of trucks, trailers and combinations thereof. My invention may be used to control and indicate the operating status of not only this type of refrigerating unit U, but all other independent power-driven refrigerating devices used on trucks and trailers, for each of these units must of necessity employ a prime mover, a starting device, and defrosting mechanism. As best seen in Figures 1 to 3 of the drawings, my invention includes a completely enclosed housing 200, preferably fabricated of sheet metal, that is supported by conventional means (not shown) at a convenient location in cab C. Four openings 201, 202, 203, and 204 are formed in housing 200. Four colored incandescent bulbs 210, 211, 212, and 213 are provided which have supporting sockets 215, 216, 217, and 218 respectively. One bulb and socket assembly is positioned behind each opening 201–204 within housing 200, whereby a portion of each bulb may be seen when illuminated. An engine E starting switch 219 and a defrosting switch 220 is utilized in controlling unit U, which switches are positioned within housing 200 but have actuating handles projecting therefrom.

While the color thereof may be a matter of choice, bulb 210 is preferably blue, and when illuminated indicates that starting switch 219 is closed. When lit, bulb 211 which is preferably green in color, shows that engine E is operating. Amber colored bulb 212 when illuminated visibly signals that engine E is being started. When the unit U is defrosting, the red bulb 213 is electrically energized to indicate this operation is taking place.

One terminal of socket 215, as shown in Figure 3, is connected by an electrical conductor 221 to a contact 222 of switch 219. Switch 219 is provided with a movable blade 223 connected to a conductor 224, which conductor extends to a prong 224a forming a part of an electrical connector 225 adapted to be separated into two portions 226 and 227 (see Figure 2). A conductor 228 leads from a prong 228a to one of the terminals of socket 215. Three branch conductors generally designated 229, 230, and 231 extend from junction points 229a, 230a, and 231a on conductor 228 to terminals of sockets 216, 217, 218 respectively. One terminal of socket 217 is connected to a conductor 232 extending to a prong 232a. A conductor 233 connects one terminal of socket 216 and a prong 233a. Switch 220 which is of the double pole, single throw type, is provided with a contact 234 from which a conductor 235 leads to one of the terminals of socket 218. A conductor 237 extends from a contact 234a on switch 220 to prong 237a. The two blades 238 of switch 220 are connected by a conductor 239 to a prong 239a. A conductor 240 proceeds from contact 222 of switch 219 to a prong 240a.

The previously mentioned prongs, as may be seen in Figure 2, are shielded by a cylindrical shell 250 which has an exteriorly disposed lug 251 adapted to be slidably inserted in slot 252 formed in connector portion 227. When lug 251 is inserted in slot 252, shell 250 may be slidably positioned in an annulus-shaped recess 253 formed in connector portion 227, and the prongs 239a, 236a, 237a, 224a, 240a, 233a, 232a, and 228a engage complementary bores identified herein by corresponding numerals, but carrying the suffix "b." The connector portions are removably held together by means of a tapped ring 254 on connector portion 226 which engages threads 255 formed on connector portion 227. Connector 225 serves to removably connect conductors 239, 236, 237, 224, 240, 233, 232, and 228 to extensions thereof which are correspondingly identified by the same numerals but carrying a prime. The extensions are affixed to various terminals and portions of the unit U wiring to be further described in detail hereinafter.

As may be seen in Figure 4, conductor 228' is connected to conductor 20 leading to ground G'. Conductor 233' forming a part of the circuit to the green (engine running) bulb 211, is connected to junction point 45. Amber (engine starting) bulb 212 is illuminated when electrical current is transferred through conductor 232' leading to junction point 90a on conductor 90. Conductor 224' connects with blade 32 of switch 21, and conductor 240' to contact 33 of the same switch. Conductor 239' leads to junction point 40, and conductors 236' and 237' to terminal points 115 and 110a respectively.

The operation of my invention in conjunction with the refrigeration unit U is as follows. When the driver in cab C desires to place the unit in operation he simply closes switch 219, which electrically energizes the circuit shown in Figure 4 in the same manner as the closing of switch 21 previously described. Electrical power is transmitted to conductor 239 from junction 40 of the previously described circuit when switch 219 is closed, whereby the blue bulb 210 is illuminated to visually indicate that switch 219 is closed. Bulb 210 will remain illuminated so long as switch 219 remains in the closed position.

Amber bulb 212 will only be actuated when the engine E is being started. Engine E operates the refrigerant compressor (not shown) until such time as the temperature of the space being cooled rises above a predetermined temperature. When the temperature of the refrigerated space drops below this predetermined point, the thermostat arm 42 automatically disengages from contact 45 whereby the circuit to ignition assembly 52 is broken, causing engine E to stop. Thermostat arm 42 will also automatically re-engage contact 45 and re-establish the circuit to engine E when the temperature again rises above said predetermined temperature to cause operation of engine E. When the starter turns over the engine, a circuit is completed, actuating carburetor choke 89 and bulb 212. Electrical power is transmitted to bulb 212 from junction point 90a and conductor 20. However, after engine E is started the circuit to choke 89 is broken and bulb 212 will no longer be lighted.

Green bulb 211 signals that engine E is operating when lighted, and this bulb receives power through conductors 228 and 240 transferred thereto from contact 33 of switch 21 and conductor 20.

Defrosting of unit U from cab C is effected by closing switch 220, which results in completion of an electrical circuit to energize defrost valve 118 and damper solenoid 111, as well as causing illumination of red bulb 213 throughout the defrosting operation. When the defrosting operation is completed, the switch 220 is placed in the open position and the unit U refrigerates in the manner previously described in detail.

Although but a single connector 225 is shown as being used in the invention, it will be apparent that if desired, a number of connectors could be utilized in removably joining conductors 239, 236, 237, 224, 240, 233, 232, 228 to their extensions which proceed to the unit U. Likewise it is possible to place a number of the inventions in the cab C. For example, one of the inventions could be employed to control and indicate the operating status of the unit U on the truck body, or the first trailer in the event the cab is on a tractor. A second of the inventions in cab C could be used to control and indicate the operating status of a second trailer drawn by the first trailer. In conjunction with the second invention, conductors 239', 236', 237', 224', 240', 233', 232', and 228' would necessarily have to be mounted on the first trailer and provided on each end with suitable connectors, such as connector 225 shown in Figure 2. Conductors would extend from the most rearwardly disposed of said connectors to the unit U on the second trailer, and another set of conductors would extend from the forwardly disposed connector on the first trailer to cab C, in the same manner as shown in Figures 1 and 2. It will be apparent that there is no limit to the number of trailers or vehicles in which the units U are mounted may be controlled, and their operating status determined by means of the present invention.

Although the invention herein described is fully capable of providing the objects and advantages hereinbefore described, it is to be understood that it is merely the presently preferred embodiment of the device, and that it is not to be limited to the details of construction herein shown other than as defined in the claims.

I claim:

1. A combined indicator and control system for remote location on a vehicle for an internal combustion engine powered refrigeration system positioned on a trailer and having operatively connected an internal combustion engine, a starter-generator, a storage battery with one grounded terminal, an ignition system, a carburetor choke and relays for controlling the same, a starting circuit, a thermostat positioned in said trailer and a thermostat activated switch connected to said starter and ignition system, a solenoid for actuating a defroster valve for refrigerant and a solenoid for actuation of a defroster damper, said combined indicator and control comprising in combination, a control box mountable at a remote control position having a starter switch and a first indicator lamp, said indicator lamp being connected to the grounded terminal of said battery and to said starter switch, said starter switch being connected to the other terminal of said battery and to said starting circuit whereupon closing said starter switch completes circuits from said battery to said lamp and to said starter and ignition systems, said thermostat actuated switch completing on high temperature conditioning of the thermostat to conditions in said trailer, a circuit to said starter and ignition system whereby said starter-generator cranks said internal combustion engine and said first indicator lamp indicates a cranking condition on closing of starter switch.

2. A system according to claim 1 including a second indicator lamp in said control box and connected to said grounded terminal of said battery and to said thermostat actuated switch whereupon closure of said starter switch and said thermostat switch also completes a circuit to said second indicator lamp indicating a closed position of said thermostat switch, responsive to a high temperature condition in said trailer as well as a cranking condition of said engine.

3. A system according to claim 2 wherein said carburetor choke relays are connected in said starter circuit and including a third indicator lamp in said control box connected to said grounded terminal of said battery and to said carburetor choke controlling relays whereupon closure of said starter switch also completes a circuit through said starter circuit and relays for choking the carburetor and to said third indicator light indicating choking of said carburetor and cranking condition of said engine.

4. A system according to claim 3 including a fourth indicator lamp and a defrost switch means in said control box, said defrost switch means having a first and a second terminal, said fourth lamp being connected to said grounded terminal of said battery and to said second terminal of the defroster switch means, said defroster switch means having the first terminal connected to said starter and ignition system of said internal combustion engine and the second terminal to said solenoid for the defroster valve, whereupon closure of said starter switch completes a circuit to said starter and ignition system and closure of said defrost switch means causes energization of said solenoid to open said defrost valve and illumination of said fourth lamp indicating an open condition of said defrost valve.

5. A system according to claim 4 wherein said defrost switch means includes a third terminal whereby a circuit is completed from said first to third terminals on closure of the switch, a conductor between said third terminal on the defrost switch and said solenoid for said defrost damper and actuatable simultaneously on closing said defrost switch means to the solenoid on said defrost valve whereupon closure of the defrost switch means actuates both said valve and said damper and illuminates said fourth indicator lamp.

6. A combined indicator and control system for remote location on a vehicle for an internal combustion engine powered refrigeration system positioned on a trailer and having operatively connected an internal combustion engine, a starter-generator, a storage battery with one grounded terminal, an ignition system, a thermostat positioned in said trailer and a thermostat actuated switch connected to said starter and ignition system and a solenoid for actuating a defroster valve for refrigerant, said combined indicator and control comprising in combination a control box mountable at a remote control position having a defroster switch means, a defroster indicator lamp and a thermostat switch position indicating lamp, said defroster switch means having a first and a second terminal, said first terminal on the defrost switch being connected to said starter and ignition system, said second terminal on the defrost switch being connected to said solenoid for the defroster valve, said defrost indicating lamp being connected to said grounded battery terminal and to said second terminal of the defroster switch means, said thermostat switch position indicating lamp being connected to said grounded battery terminal and to said thermostat actuated switch whereupon a circuit is completed to said thermostat switch position indicating lamp to indicate a closed position of said thermostat switch and a running condition of said internal combustion engine driving said refrigeration system, said defrost switch means on being closed completing a circuit to defrost valve to reverse the flow of refrigerant to defrost the refrigeration system and whereby a circuit is completed to said defrost indicating lamp which is illuminated and indicates a defrosting position of said defrost valve.

References Cited in the file of this patent

UNITED STATES PATENTS

| 1,086,682 | Menzel | Feb. 10, 1914 |
| 2,385,525 | McCloy | Sept. 25, 1945 |

OTHER REFERENCES

Instruments, titled "Automatic Starter for Internal-Combustion Engines," pp. 316 and 318 of May 1943 issue.